United States Patent Office 3,079,371
Patented Feb. 26, 1963

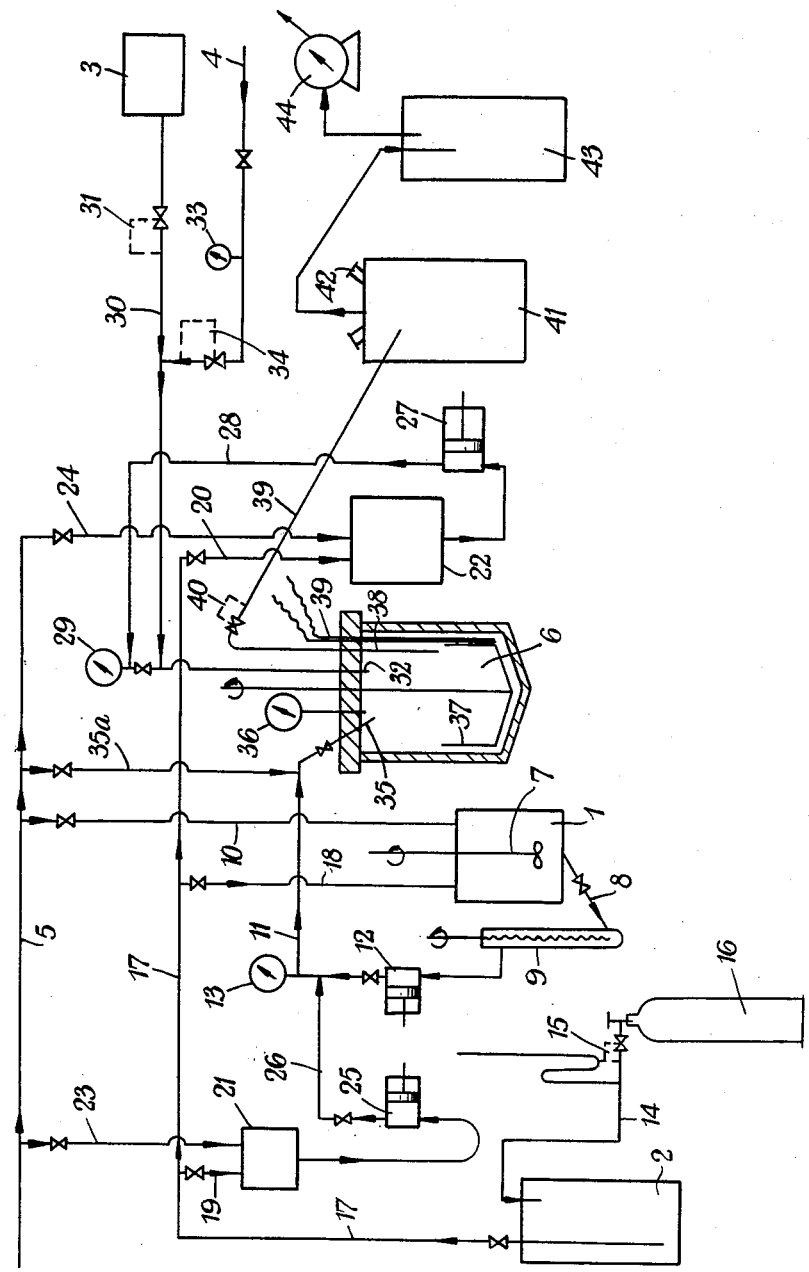

3,079,371
PRODUCTION OF ETHYLENE POLYMERS USING A CATALYST BASED ON TITANIUM TETRA-CHLORIDE AND ALUMINUM
Gilbert Bo, Edouard Fichet, and André Perrot, Lyon, and Philippe Perras, Collonges au Mont d'Or, France, assignors to Societe des Usines Chimiques Rhone-Poulenc, Paris, France, a corporation of France
Filed May 19, 1958, Ser. No. 735,959
Claims priority, application France May 29, 1957
9 Claims. (Cl. 260—94.9)

This invention relates to the production of new catalysts for the polymerisation of ethylene, and to their use in making solid ethylene polymers of high molecular weight.

It is known that mixtures of solid products and oils can be obtained by polymerising ethylene in the presence as catalysts of mixtures of aluminium chloride and titanium tetrachloride, to which may be added small quantities of metals capable of combining with hydrochloric acid such as aluminium, zinc and iron.

Various modifications of this process have been put forward with a view to obtaining solid polymers alone. Thus it has been proposed to polymerise ethylene by bringing it into contact with a mixture of titanium tetrachloride and aluminium. However, while entirely or mainly solid products can be obtained in this way, polymerisation commences only after the ethylene has been heated with the catalyst for a number of hours. This long induction period is an obstacle to the development of a continuous industrial process.

In another process which has been proposed, the catalyst consists of titanium compounds in which the titanium has a valency lower than three. Such catalysts are obtained, for example, by the prolonged action of aluminium on titanium tetrachloride at an elevated temperature. Their productivity is, however, low. (By productivity is meant here the quantity of polymer produced per unit weight of catalyst before the activity of the catalyst falls to an undesirably low level.)

The present applicants have proposed to use as catalysts for the polymerisation of ethylene products obtained by heating aluminium with titanium tetrachloride in the absence of ethylene and other hydrocarbons capable of polymerising under the conditions employed. In accordance with the operating conditions catalysts are obtained which are distinguished by their colours, which range from pink to black. These catalysts, while they can be very effective, have the disadvantage that their efficiencies vary a good deal; in other words, they are not as consistently good as is desirable.

Accordingly, one object of the present invention is to provide a method of making catalysts for the polymerisation of ethylene, in particular catalysts obtained by heating aluminium and titanium tetrachloride in the absence of ethylene as described above, which shall give products which have consistently good activity and productivity. Another object is to provide catalysts which are generally superior to those previously made by the reaction of aluminium with titanium tetrachloride. Yet another object is to provide an improved method for making solid polymerisation products of ethylene.

According to the invention catalysts for the polymerisation of ethylene are made by a process which comprises forming a primary catalyst by heating titanium tetrachloride with a molecular excess of aluminium (i.e. more than 1 atom of aluminium for each molecule of titanium tetrachloride) in the absence of ethylene and other hydrocarbons which would polymerise under the conditions employed and in the presence of a liquid diluent consisting of at least one saturated aliphatic or cycloaliphatic hydrocarbon (i.e. at least one completely saturated hydrocarbon) and at least one aromatic hydrocarbon, the temperature to which and the time for which the said reactants are heated being such that in the product the titanium is substantially all in a trivalent form, and subsequently adding further titanium tetrachloride to the primary catalyst. It is found that the addition of further titanium tetrachloride to the primary catalyst considerably increases its productivity.

It will be seen, therefore, that the catalyst, when first brought into contact with the ethylene to be polymerised, comprises (1) a reaction product of aluminium and titanium tetrachloride in which the titanium is wholly or substantially wholly in the trivalent form, (2) free aluminium, and (3) free titanium tetrachloride, and that the relative proportion in which each component occurs can be accurately predetermined.

It has furthermore been observed that a catalyst which might be expected to have the same composition, but which has been made by stopping the reaction between the aluminium and titanium tetrachloride when some of the latter still remains unreacted, has not the same good properties as catalysts made in accordance with the invention. It is, in fact essential to convert the titanium tetrachloride completely into titanium trichloride in a first stage and thereafter to add further titanium tetrachloride to the primary catalyst so obtained. It has also been observed that if, in this first stage, the reaction is carried on beyond the point at which substantially all the titanium is in the trivalent form, a further addition of titanium tetrachloride only slightly improves the catalyst.

The aluminium used in making the primary catalyst, is preferably in a finely-divided form, e.g. as powder or flakes, and it is desirable to agitate the mixture of the reactants vigorously so as to keep the surface of the aluminium clean and ensure efficient contact betwen it and the titanium tetrachloride.

The relative proportions of aluminium and titanium tetrachloride used may vary within wide limits. The ratio $$\frac{\text{aluminium atoms}}{\text{TiCl}_4 \text{ molecules}}$$

(which will hereinafter be termed the molecular ratio of aluminium to titanium tetrachloride) is preferably at least 3:1 and may be as high as 20:1, or even higher. It is found that when a large excess of aluminium is used, other things being equal, the polymers obtained are more uniform in respect of their molecular weights. In fact with molecular ratios higher than 20:1 and under otherwise identical conditions, practically no variations are observed either in the nature of the catalysts obtained or in the molecular weights of the polymers to which they lead.

The proportion of aromatic component in the diluent need not be great, and may with advantage be between 0.5 and 5% by volume. In any case it is preferable that the volume of the aliphatic or cycloaliphatic component should exceed that of the aromatic component. Preferably the reaction is carried out at a temperature up to about 300° C., in particular within the range 200°–300° C. It is, of course, necessary to employ a reaction vessel capable of withstanding the vapour pressure of the diluent at the temperature employed.

The reaction conditions for making the primary catalyst, such as the duration of the reaction, the temperature, the nature of the diluent and the initial concentration of titanium tetrachloride in the diluent are to some extent interdependent, and the optimum conditions can readily be determined by means of simple tests in any particular case. By way of example, it may be stated that a primary catalyst of good quality is obtained by heating aluminium and titanium tetrachloride in a molecular ratio of at least 3:1 for one hour at 220° C. in a diluent consisting of a mixture of cyclohexane and benzene in which the proportion of benzene is 0.5 to 2% by volume, the initial concentration of titanium tetrachloride in the diluent being 5-7% by weight. Under these conditions all the titanium tetrachloride is converted into titanium trichloride.

The primary catalyst is preferably not separated from the diluent before the further titanium tetrachloride is added, and indeed it will often be advantageous to dilute the suspension of the primary catalyst further, preferably with the same aliphatic or cycloaliphatic hydrocarbon as was present in the diluent used in making the primary catalyst. The addition of the further titanium tetrachloride does not change the appearance of the catalyst. The amount added is preferably between about half and twice the amount employed in making the primary catalyst; for example, it may very suitably be equal to that amount.

The polymerisation of ethylene in the presence of the catalysts of the invention may be carried out as a batch or as a continuous process, preferably using the same diluent as that in which the catalyst is finally obtained, if desired with the addition of further diluent, e.g. further aliphatic or cycloaliphatic hydrocarbon. The polymerisation takes place very readily at ethylene pressures below 50 atmospheres, for example between 5 and 50 atmospheres; although higher pressures can be used, no particular advantage will normally result. Temperatures between about room temperature and 200° C. may be used, temperatures of 110-170° C. being preferred. A very useful combination of conditions is a polymerisation temperature in the neighbourhood of 140° C. in conjunction with an ethylene pressure in the neighbourhood of 30 atmospheres.

The ethylene employed may be a technical moisture-free product having the lowest possible carbon monoxide content. The normal standard impurities such as hydrogen and methane are not troublesome.

Oxygen becomes a poison for the catalyst only when more than a certain proportion is present. It has even been observed that the addition of small quantities of oxygen to the ethylene has the effect of lengthening the useful life of the catalyst and consequently increasing its productivity. The most favourable quantity of oxygen to use is between 50 and 100 cc. (as measured at 0° C. and 760 mm. pressure) for each cc. of titanium tetrachloride employed in making the catalyst. Below this range the productivity decreases slightly while, on the other hand, the viscosity of the polymers formed increases. Above this range, the reverse happens.

When the ethylene is polymerised by a batch method the primary catalyst and the diluent may first be introduced into a reaction vessel capable of withstanding pressures up to 50 atmospheres, and the further titanium tetrachloride then added. Throughout these operations the vessel should contain an oxygen-free inert atmosphere. The ethylene may now be introduced under pressure, and the mixture heated to the temperature chosen for the polymerisation.

It will, however, usually be preferred to operate continuously, the polymer produced being withdrawn from the reaction vessel after a time which is dependent on the temperature and ethylene pressure employed. Usually a time of between about 30 minutes and two hours is suitable.

The relative proportions of the ethylene, diluent, and catalyst should be so chosen that the suspension of polymer produced is sufficiently dilute to avoid obstruction of the orifices of the reactor and, in particular, the valve through which polymer is withdrawn. A suitable concentration of polymer is between 5 and 15% and especially between 8 and 10% by weight of the polymer suspension.

The accompanying drawing represents diagrammatically an apparatus which may be used for the continuous polymerisation of ethylene in accordance with the invention.

Referring now to the drawing, the apparatus comprises a reservoir 1 for catalyst suspension, a reservoir 2 for diluent, a source 3 of ethylene, a source 4 of oxygen, a source of nitrogen represented by the header line 5, and a reactor 6 in which the polymerisation is carried out.

The catalyst reservoir 1 is provided with an input for catalyst suspension (not shown), a stirrer 7 and an output line 8 leading to a homogeniser 9, and is connected with the nitrogen header 5 by a line 10. The homogeniser 9 is connected to the reactor 6 by a line 11 containing a pump 12 having double valves, the delivery of which can be varied by means of a device (not shown) for adjusting the stroke of the piston. A pressure gauge 13 is connected to the line 11 between the pump and the reactor.

The diluent reservoir 2 is connected by a line 14 through a pressure regulator 15 to a source 16 of nitrogen under pressure, by means of which diluent can be forced from the reservoir 2 into the other parts of the system as required. A diluent header 17 runs from a point near the bottom of the reservoir 2, and is connected by a line 18 with the catalyst reservoir 1, and also by lines 19, 20 with sub-reservoirs 21, 22, which are also connected by lines 23, 24 to the nitrogen header 5. The sub-reservoir 21 is connected via a pump 25 and line 26 with the catalyst feed line 11, and the sub-reservoir 22 is connected via a pump 27 and line 28 to an ethylene feed line (to be described). The line 28 is also connected to a pressure gauge 29.

From the source 3 of ethylene and ethylene feed line 30, provided with a pressure regulator 31 to keep the pressure in the line 30 constant, leads to a gas inlet 32 in the top of the reactor 6. The diluent feed line 28 runs into the ethylene feed line 30 near the reactor 6.

The source of oxygen 4 is shown as a feed line connected to a pressure gauge 33 and leading via a pressure regulator 34 into the ethylene feed line 30.

The reactor 6 is provided with an inlet 35 connected to both the catalyst feed line 11 and (through a line 35a) the nitrogen header 5, a pressure gauge 36, a frame-type stirrer 37 adapted to be rotated by suitable driving means (not shown), the gas inlet 32 already referred to, an outlet pipe 38 extending about halfway down the reactor, and a thermocouple in a well 39 by means of which the temperature of the contents of the reactor 6 can be observed. The outlet pipe 38 leads via a line 39 and pressure regulator 40 to an expansion chamber 41 provided with openings 42 for removing solid or semi-solid material from it. A further vessel 43 communicates with the expansion chamber 41, and is connected in turn to a recording gas meter 44.

As indicated in the drawing, the various feed lines are provided with valves as necessary.

In operation reservoir 1 contains the suspension of catalyst in diluent, which is kept well mixed by the stirrer 7, finally stabilised and homogenised by the homogeniser 9, and forced by the pump 12 into the reactor 6. At the same time ethylene, with which oxygen from the source 4 can be mixed as desired, is forced under pressure into the reactor 6. Further diluent is supplied via the sub-reservoirs 21 and 22 and their associated pumps, and also to the catalyst reservoir 1 through the line 18, as required to ensure that the concentration of polymer in the liquid in the reactor does not rise high enough to cause blockages at any point. The slurry of polymer in diluent formed in the reactor 6 passes via the outlet 38 and the pressure regulator 40 to the expansion chamber 41, in which the greater part of the diluent evaporates, leaving the polymer as a solid mass impregnated with diluent and containing the catalyst. Unchanged ethylene and diluent vapours pass over to the vessel 43 in which the diluent is condensed, and the ethylene leaves the system after passing through the recording gas meter 44. The polymer is removed from the expansion chamber 41 at intervals, and purified. For example, it may be freed from diluent by centrifuging and drying, and then dissolved in hot cyclohexane or other solvent under pressure. The solution may then be freed from catalyst by filtration while it is still hot, after which the solvent may be eliminated and the polymer dried.

The following examples, which are not limitative, illustrate the invention further.

EXAMPLE I

Discontinuous Polymerisation

Into an autoclave of the shaking type was introduced a sealed glass tube having a capacity of 60 cc. and containing 3 g. of finely powdered aluminium, 1.7 g. (1 cc.) of freshly distilled titanium tetrachloride, 15 cc. of pure cyclohexane distilled over sodium and 0.5 cc. of pure benzene distilled over sodium. On heating for 1 hour at 220° C. a suspension of a pink powder in cyclohexane was obtained. All the titanium tetrachloride had disappeared.

1000 cc. of anhydrous cyclohexane were introduced into a stainless steel autoclave having a capacity of 3600 cc., provided with agitating means comprising a rotating frame for effecting vigorous mixing, in which the air had been replaced by nitrogen. The contents of the aforesaid tube and also a further 1.7 g. of titanium tetrachloride were then introduced, while the stream of nitrogen was maintained. The autoclave was then closed. 100 cc. of oxygen were then introduced, after which agitation was started and the contents of the autoclave heated to 100° C. At this temperature, ethylene free from moisture and from carbon monoxide was introduced under pressure until the pressure in the autoclave reached 30 kg./cm.$^2$, the autoclave still being at 100° C. Heating was continued, and during this second period, which lasted 20 minutes, a temperature of 140° C. was reached. The pressure, which had continued to rise regularly, became steady between 135° and 140° C. at 40 kg./cm.$^2$, after which it began to fall as the ethylene was removed from the gas phase by polymerisation. Heating was now discontinued, and after 1 or 2 minutes the temperature rose spontaneously while the pressure fell rapidly. When the pressure had fallen to 25 kg./cm.$^2$, further ethylene was forced into the autoclave to bring the pressure back to 30 kg./cm.$^2$. When the pressure had again fallen to 25 kg./cm.$^2$ it was raised again to 30 kg./cm.$^2$ by forcing in further ethylene, and so on for 1 hour 40 minutes, from the time when consumption of ethylene by polymerisation began. 25 cc. of oxygen were introduced at regular intervals (every quarter of an hour during the last hour).

Throughout the polymerisation the temperature remained practically constant at about 145° C. The sum of the pressure drops from 30 to 25 kg./cm.$^2$ reached 100 kg./cm.$^2$. At the commencement of the polymerisation the pressure drop from 30 to 25 kg./cm.$^2$ extended over a period of 2 to 4 minutes, and when the experiment was stopped this same pressure drop only took 5 to 6 minutes, which shows that the polymerisation was still extremely rapid, and therefore that the catalyst had retained nearly all its initial activity.

The main reason why the operation was stopped was difficulty in stirring due to the high concentration of polymer which had accumulated in the cyclohexane.

After the autoclave had cooled, the unreacted ethylene was blown off and the autoclave opened. It was found to be practically full of a grey, hard mass impregnated with cyclohexane. This crude polymer was crushed and purified by dissolving it in hot cyclohexane under pressure, filtering this solution, and reprecipitating the polymer by evaporation of the solvent. There was obtained 400 g. of a white polymer having a specific viscosity 1.00 (determined at 130° C. in 0.4% solution in tetralin).

This polymer had substantially the same physical and mechanical properties as the product of Example II (see below). Its density of 0.960 indicated that it was highly crystalline.

The productivity worked out at 115 g. of polymer per g. of titanium tetrachloride, but as already stated the catalyst was still active so that this figure is actually too low.

EXAMPLE II

Continuous Polymerisation

A number of similar catalyst charges were made in stainless steel autoclaves having an internal capacity of 500 cc. and agitated by a device of the "shaking" type. Each charge was made by introducing into the autoclave 6 g. of aluminium powder, 80 cc. of cyclohexane distilled over sodium, 2 cc. (3.45 g.) of freshly distilled titanium tetrachloride and 8 stainless steel balls intended to improve the effectiveness of the agitation, a nitrogen atmosphere being maintained throughout. The autoclave was then closed. The temperature was raised to 220° C. in 1 hour with agitation, and maintained at this level for exactly one further hour. After this heating period the autoclave was cooled and kept closed until its contents had been used up. 20 charges of primary catalyst were prepared in this way.

It is obvious that it would have been possible to prepare a very much smaller number of primary catalyst charges by increasing their size, but it was preferred to prepare a large number of charges in order to show the reproducibility of the process and the uniformity of the polymer obtained.

The polymerisation was effected in the apparatus previously described by reference to the drawing.

The entire installation was first placed under a nitrogen atmosphere so as to eliminate moisture and oxygen, after which the sub-reservoirs 21 and 22 feeding the pumps 25 and 27 were filled with cyclohexane, a nitrogen atmosphere being maintained in each.

400 cc. of cyclohexane were forced into the reactor 6 by the pump 27 and agitation and heating of the reactor begun. After these 400 cc. of cyclohexane had been introduced, ethylene was forced through the feed line 30 until the pressure in the reactor reached 20 kg./cm.$^2$. Simultaneously there were introduced into the catalyst reservoir cyclohexane (3 litres), a primary catalyst charge prepared as described above, and 2 cc. of fresh titanium tetrachloride, that is to say, a quantity equal to that which was used to prepare one charge of primary catalyst.

This first batch of catalyst was homogenised and fed to the reactor at a rate of 1600 cc. per hour. During the same period, 200 cc. of oxygen (equal to 50 cc. per cc. of titanium tetrachloride) was introduced.

When half of this first batch of catalyst had been fed the temperature in the reactor reached 140° C. The pressure, which had reached a maximum of 22 kg./cm.$^2$, then started to fall and the temperature rose slightly, indicating that polymerisation had begun. The reactor was then placed in communication with the ethylene source through the automatic pressure regulator 31, which was adjusted to give a pressure of 30 kg./cm.$^2$. The supply of heat was reduced so as to maintain a temperature between 145° and 150° C. throughout the remainder of the operation.

When 2 litres of cyclohexane (including the catalyst suspension) had been introduced into the reactor, the output 38 was brought into action so as to maintain the contents of the reactor at a constant level.

When almost all the first batch of catalyst had been fed to the reactor a second batch was prepared which, like all the succeeding batches, was dispersed in 4 litres of cyclohexane. An additional quantity of cyclohexane was fed by means of the pumps 25 and 27 so as to maintain the concentration of the polymer suspension in the reactor at about 8%.

The operating conditions are summarised in the following table. They remained constant throughout the whole of the 55 hours during which the operation was carried on.

| | |
|---|---|
| Ethylene pressure | 30 kg./cm.² |
| Temperature in the reactor | 145°–150° C. |
| Concentration of the catalyst suspension fed to the reactor | 1 charge in 4 litres of cyclohexane. |
| Rate of feed of the catalyst suspension | 1600 cc./hour. |
| Rate of additional feed of cyclohexane | 1000 cc./hour. |
| Oxygen feed | 50 cc./cc. of $TiCl_4$ employed. |

In all, 20 charges of primary catalyst identical with that whose preparation is described above were employed.

In order to show any changes in the productivity of the catalyst and the quality of the product produced, the polymer was removed after the whole of each batch of catalyst had been fed to the reactor, and the batches so obtained were separately purified and then weighed. The amount of polymer found during the introduction of the various batches of catalyst determined in this way varied within the narrow limits of 65–75 g.

The physical and mechanical properties of the polymers of the various batches obtained were as follows:

Specific viscosity (measured in 0.4% solution in tetralin at 130° C.)—0.9 to 1.0
Density at 20° C.—0.960 (measured on injection-moulded test pieces)
Modulus of elasticity (kg./mm.²) at 25° C.—175; at 60° C.—30
Tensile strength (kg./mm.²)—5
Elongation at rupture—12%
Brinell hardness (kg./mm.²)—7
Rupture energy in kg./cm. for a cross-section of 21 mm.² (according to the standard ASTM D 256–54T test on the Dynstat apparatus of the modified Izod type, the point of impact for obtaining the rupture being situated 1 mm. from the point at which the test piece is lodged):
  Direction parallel to the injection—18 kg./cm.
  Direction perpendicular to the injection—9.5 kg./cm.

We claim:
1. In the process for the production of wholly solid polymerisation products of ethylene using a catalyst based on titanium tetrachloride and aluminium, the improvement which consists in making the catalyst in two stages, namely
  (A) forming a primary catalyst free from divalent titanium by heating to a temperature of 200°–300° C. a mixture of titanium tetrachloride and aluminium in the absence of ethylene and of other hydrocarbons capable of polymerising under the conditions of temperature and pressure employed and in the presence of a liquid diluent consisting of at least one completely saturated hydrocarbon and at least one aromatic hydrocarbon, the aromatic hydrocarbon being in a proportion of 0.5–5% of the total volume of the diluent, for a time sufficient to reduce all the titanium to the trivalent state, and
  (B) subsequently adding free titanium tetrachloride, in amount between half and twice the amount used in making the primary catalyst, to the suspension of the primary catalyst so obtained.
2. Process according to claim 1, wherein the molecular ratio of aluminium to titanium tetrachloride is at least 3 to 1.
3. In the process for the production of wholly solid polymerisation products of ethylene using a catalyst based on titanium tetrachloride and aluminium, the improvement which consists in making the catalyst in two stages, namely
  (A) forming a primary catalyst free from divalent titanium by heating to a temperature of 200°–300° C. a mixture of titanium tetrachloride and aluminium in the absence of ethylene and of other hydrocarbons capable of polymerising under the conditions of temperature and pressure employed and in the presence of a liquid diluent consisting of cyclohexane and benzene, the benzene being in a proportion of 0.5 to 5% of the total volume of the diluent, for a time sufficient to reduce all the titanium to the trivalent state, and
  (B) subsequently adding free titanium tetrachloride, in amount between half and twice the amount used in making the primary catalyst, to the suspension of the primary catalyst so obtained.
4. Process according to claim 3, wherein the molecular ratio of aluminium to titanium tetrachloride is at least 3 to 1.
5. Process for the production of wholly solid polymerisation products of ethylene using a catalyst based on titanium tetrachloride and aluminium, which comprises making the catalyst in two stages, namely
  (A) forming a primary catalyst free from divalent titanium by heating to a temperature of 200°–300° C. a mixture of titanium tetrachloride and aluminium in the absence of ethylene and of other hydrocarbons capable of polymerising under the conditions of temperature and pressure employed and in the presence of a liquid diluent consisting of at least one completely saturated hydrocarbon and at least one aromatic hydrocarbon, the aromatic hydrocarbon being in a proportion of 0.5–5% of the total volume of the diluent, for a time sufficient to reduce all the titanium to the trivalent state, and
  (B) subsequently adding free titanium tetrachloride, in amount between half and twice the amount used in making the primary catalyst, to the suspenison of primary catalyst so obtained, and contacting ethylene at a temperature between room temperature and 200° C. under a pressure of 5–50 atmospheres with the catalyst until it has polymerised to a solid.
6. Process according to claim 5, wherein the ethylene is contacted with the catalyst at a temperature of 110°–170° C. and the catalyst is in suspension in a liquid hydrocarbon diluent of which all the components are incapable of polymerisation under the conditions employed.
7. Process according to claim 6 which comprises also bringing into contact with the catalyst oxygen in amount equal to 50–100 volumes, as measured at 0° C. and 760 mm. pressure, for each volume of titanium tetrachloride used in making the catalyst.
8. Process for the production of wholly solid polymerisation products of ethylene using a catalyst based on titanium tetrachloride and aluminium, which comprises making the catalyst in two stages, namely
  (A) forming a primary catalyst free from divalent titanium by heating to a temperature of 200°–300° C. a mixture of titanium tetrachloride and aluminium in the absence of ethylene and of other hydrocarbons capable of polymerising under the conditions of temperature and pressure employed and in the presence of a liquid diluent consisting of cyclohexane and benzene, the benzene being in a proportion of 0.5–5% of the total volume of the diluent, for a time sufficient to reduce all the titanium to the trivalent state, and
  (B) subsequently adding free titanium tetrachloride, in amount between half and twice the amount used in making the primary catalyst, to the suspension of primary catalyst so obtained, and contacting ethylene at a temperature of 110°–170° C., the catalyst being in suspension in a mixture of cyclohexane and benzene.

9. Process according to claim 8, which comprises also bringing into contact with the catalyst oxygen in amount equal to 50 to 100 volumes, as measured at 0° C. and 760 mm. pressure, for each volume of titanium tetrachloride used in making the catalyst.

References Cited in the file of this patent

UNITED STATES PATENTS

| | | |
|---|---|---|
| 2,827,446 | Breslow | Mar. 18, 1958 |
| 2,827,447 | Nowlin et al. | Mar. 18, 1958 |
| 2,846,427 | Findlay | Aug. 5, 1958 |
| 2,886,560 | Weber et al. | May 12, 1959 |
| 2,893,984 | Seelbach et al. | July 7, 1959 |
| 2,898,327 | McCulloch et al. | Aug. 4, 1959 |
| 2,899,418 | Reynolds | Aug. 11, 1959 |
| 2,915,514 | Denkowski | Dec. 1, 1959 |

FOREIGN PATENTS

| | | |
|---|---|---|
| 526,101 | Italy | May 14, 1955 |
| 538,782 | Belgium | Dec. 6, 1955 |
| 1,132,506 | France | Nov. 5, 1956 |
| 874,215 | Germany | Apr. 20, 1953 |

OTHER REFERENCES

Ruff et al.: Zietschrift für Anorganische Chemie, vol. 128, pages 81–95, February 23, 1923.